United States Patent [19]

Fields

[11] Patent Number: 4,772,910
[45] Date of Patent: Sep. 20, 1988

[54] FULL/FILL FLASH CONTROL SYSTEM FOR CAMERAS

[75] Inventor: Roger A. Fields, Pittsford, N.Y.

[73] Assignee: Eastman Kodak Company, Rochester, N.Y.

[21] Appl. No.: 145,333

[22] Filed: Jan. 19, 1988

[51] Int. Cl.⁴ .............................................. G03B 15/05
[52] U.S. Cl. ...................................... 354/414; 354/421
[58] Field of Search .............................. 354/414, 421

[56] References Cited

U.S. PATENT DOCUMENTS

| | | | |
|---|---|---|---|
| 3,610,122 | 5/1971 | Biber | 95/10 |
| 3,696,721 | 10/1972 | Wagner | 95/11 R |
| 4,023,187 | 5/1977 | Shenk | 354/27 |
| 4,074,287 | 2/1978 | Iwata et al. | 354/31 |
| 4,083,058 | 4/1978 | Iwata et al. | 354/128 |
| 4,159,870 | 7/1979 | Corey et al. | 354/414 |
| 4,238,154 | 12/1980 | Biber et al. | 354/198 |
| 4,291,959 | 9/1981 | Easterly | 354/31 |
| 4,317,620 | 3/1982 | Coppa et al. | 354/33 |
| 4,354,751 | 10/1982 | Izumi et al. | 354/421 |
| 4,375,322 | 3/1983 | Coppa | 354/27 |
| 4,429,969 | 2/1984 | Saegusa | 354/414 |
| 4,484,807 | 11/1984 | Kataoka et al. | 354/421 |
| 4,494,851 | 1/1985 | Maida et al. | 354/421 |
| 4,501,481 | 2/1985 | Kataoka et al. | 354/413 |
| 4,527,880 | 7/1985 | Okino | 354/421 |
| 4,712,902 | 12/1987 | Hosomizu et al. | 354/421 |

Primary Examiner—Russell E. Adams
Attorney, Agent, or Firm—Roger A. Fields

[57] ABSTRACT

An artificial illumination control system for controlling the energization of an electronic flash device during a photographic exposure interval in a camera automatically operates in a full flash mode whenever the ambient light level is too low for a proper daylight exposure and the camera-to-subject distance does not exceed a maximum distance suitable for a full flash exposure. Moreover, it automatically operates in a fill flash exposure whenever the ambient light level is bright enough that areas of the subject may be substantially shadowed and the camera-to-subject distance does not exceed a maximum distance small enough to ensure that the fill flash output will lighten the shadowed areas. The maximum distance for a fill flash exposure is always less than the maximum distance for a full flash exposure.

5 Claims, 5 Drawing Sheets

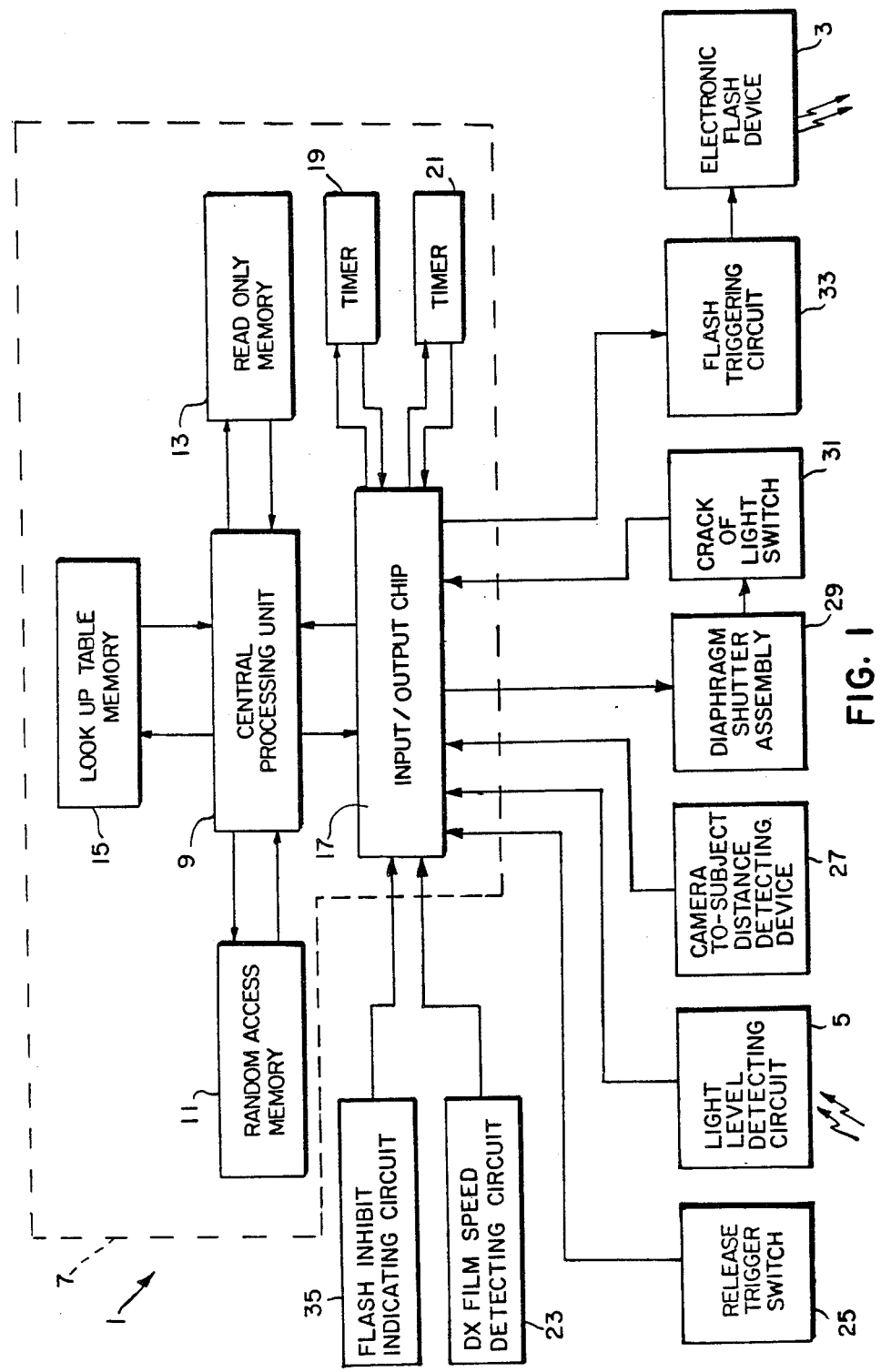
FIG. I

FIG. 2B

```
        (Y)
         ↓
┌─────────────────────┐
│ SET EXPOSURE INTERVAL│         (Z)
│   TIMER LIMIT = T3  │          ↓
└─────────────────────┘    ┌─────────────────────┐
         │                 │ SET EXPOSURE INTERVAL│
         │                 │   TIMER LIMIT = T5  │
         │                 └─────────────────────┘
         └──────────────────────────┐
                                    ↓
                        ┌─────────────────────┐
                        │ BEGIN OPENING: DIAPHRAGM│
                        │   SHUTTER ASSEMBLY  │
                        └─────────────────────┘
                                    ↓
                        ┌───────────────┐
                   NO   │   CRACK OF    │
                  ┌─────│ LIGHT SWITCH  │
                  │     │   CLOSED ?    │
                  │     └───────────────┘
                  │           │ YES
                  │           ↓
                  │  ┌─────────────────────┐
                  │  │ START EXPOSURE INTERVAL│
                  │  │        TIMER        │
                  │  └─────────────────────┘
                  │           │
                              ↓
                            (X)
```

LOOK UP TABLE MEMORY

I.

| ISO NO. SPEED FILM | MAX. CAMERA-TO-SUBJECT DISTANCE | |
|---|---|---|
| | FULL FLASH MODE | FILL FLASH MODE |
| 100 | 15 FEET | 11.5 FEET |
| 200 | 20 FEET | 11.5 FEET |
| 400, 1000 | 30 FEET | 11.5 FEET |

II.*

| AMBIENT LIGHT LEVEL/ CAMERA-TO-SUBJ.-DIST. | FLASH TIMER LIMIT | EXPOSURE INTERVAL TIMER LIMIT |
|---|---|---|
| $\leq$ 64 f.-l. <br> $\leq$ 15 FEET | $T_2$ | $T_4$ |
| $\leq$ 64 f.-l. <br> $>$ 15 FEET | — | — |
| $>$ 64 f.-l. <br> $<$ 500 f.-l. | — | $T_5$ |
| $\geq$ 500 f.-l. <br> $\leq$ 11.5 FEET | $T_1$ | $T_3$ |
| $\geq$ 500 f.-l. <br> $>$ 11.5 FEET | — | $T_3$ |

* II ASSUMES ISO 100 SPEED FILM

FIG. 3

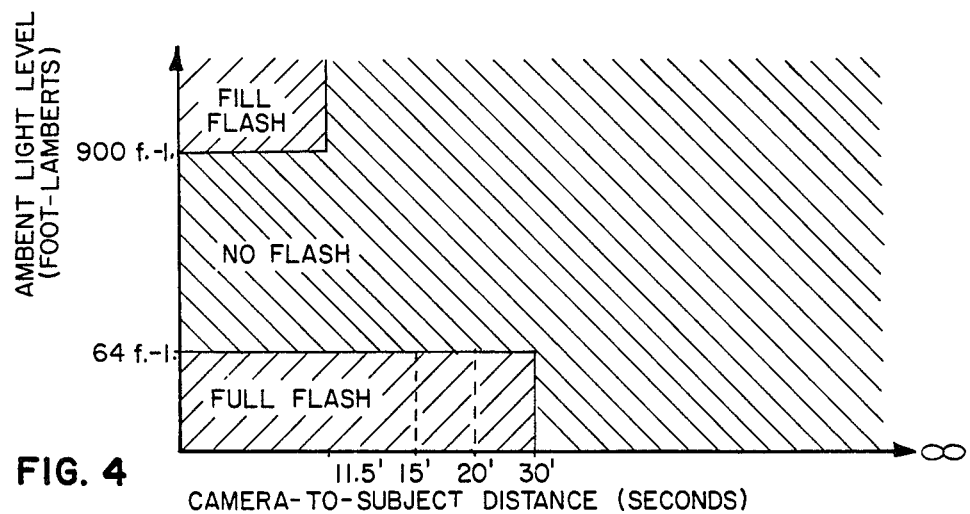

FIG. 4

FULL/FILL FLASH CONTROL SYSTEM FOR CAMERAS

CROSS-REFERENCE TO A RELATED APPLICATION

Reference is made to commonly assigned, copending U.S. patent application Ser. No. 143,418 filed Jan. 13, 1988 in the name of Stephen G. Malloy Desormeaux and entitled FILL FLASH CONTROL SYSTEM FOR CAMERAS.

BACKGROUND OF THE INVENTION

Field of the Invention

The invention relates generally to the field of photography, and specifically to an artificial illumination control system for a camera. More particularly, the invention relates to an artificial illumination control system for controlling the energization of a source of artificial illumination in a normal (or full) flash mode of operation, where ambient light levels are too low for a proper daylight exposure, and in a fill (or fill-in) flash mode of operation, where ambient light levels are relatively high but certain portions of the subject to be photographed have significantly less light falling on them than surrounding portions of the subject.

Description of the Prior Art

When taking a picture under conditions at which the levels of ambient light intensity are relatively high, such as in bright sun, but certain portions of the subject to be photographed have significantly less light falling on them than surrounding portions of the subject, resulting in the formation of dark shadows on the subject, it is desirable to provide additional scene illumination from a source of artificial illumination, such as an electronic flash device, sometimes referred to as a "strobe" unit. Situations where a source of artificial illumination are used in relatively high ambient light levels are commonly referred to as a "fill" or "fill-in" mode of flash operation.

Cameras were recently introduced several years ago, for example the KODAK MEDALIST VR 35 Camera, manufactured by Eastman Kodak Company, Rochester, N.Y., which include a manually operated fill-flash switch. The fill-flash switch must be manually closed to provide a fill flash mode of operation for a built-in electronic flash unit, and it must be held closed at the same time the shutter release button is depressed to initiate the photographic exposure interval. Conversely, in the normal flash mode of operation for use in dimly lighted surroundings, the electronic flash unit is automatically energized.

Other known cameras operate an electronic flash unit either in a normal flash mode or in a fill flash mode each time a picture is taken. Typically, in these cameras, the flash output is varied in accordance with the ambient light level.

Still other cameras inhibit, i.e. render inoperative, an electronic flash unit or shift the control mode of the camera from flash photography to daylight photography whenever the subject to be photographed is located beyond an adequately operable distance for the flash output. See U.S. Pat. No. 4,501,481 granted Feb. 26, 1985.

THE CROSS-REFERENCED APPLICATION

The application cross-referenced above discloses an artificial illumination control system for controlling the energization of an electronic flash device during a photographic exposure interval in a camera. The control system has three flash related modes of operation, full flash, no flash, and fill flash, one of which is automatically selected in accordance with the level of ambient light intensity. If the level of ambient light intensity warrants the fill flash mode but the camera-to-subject distance exceeds a predetermined distance, the fill flash mode is prevented and the control system reverts to its no flash mode. Thus, a fill flash exposure will automatically be prevented or selected in accordance with both the level of ambient light intensity and the camera-to-subject distance.

SUMMARY OF THE INVENTION

My invention deals with the known fact that most fill flash exposures involve situations where the subject to be photographed includes a person's face. Usually, the person's face is at or near the center of the picture and it is relatively close to the taking lens (as compared to the subject when making a full flash exposure). However, heretofore it appears that there was no recognized distinction between the maximum camera-to-subject distance suitable for a fill flash exposure and the maximum camera-to-subject distance suitable for a full flash exposure. According to my invention, therefore, I have devised an improved artificial illumination control system in which the maximum camera-to-subject distance for a fill flash exposure is always less than the maximum corresponding distance for a full flash exposure.

More particularly, I have devised an improved artificial illumination control system for controlling the energization of an electronic flash device during a photographic exposure interval in a camera, wherein (a) flash triggering means for energizing said electronic flash device is operated in a full flash mode to effect a full flash exposure and is operated in a fill flash mode to effect a fill flash exposure and (b) camera-to-subject distance detecting means provides a measure of the camera-to-subject distance, and wherein the improvement comprises:

comparator means for determining whether the measure of the camera-to-subject distance provided by said camera-to-subject distance detecting means does not exceed a maximum distance, which is the maximum camera-to-subject distance suitable for a full flash exposure, or does not exceed a lesser distance, which is a predetermined camera-to-subject distance small enough to ensure that the fill flash output will lighten shadowed areas of the subject during a fill flash exposure; and control means, acting subsequent to said comparator means determining that said measure of the camera-to-subject distance does not exceed said maximum distance, for operating said flash triggering means in its full flash mode, and acting subsequent to said comparator means determining that said measure of the camera-to-subject distance does not exceed said lesser distance, for operating said flash triggering means in its fill flash mode, whereby the maximum camera-to-subject distance for a fill flash exposure is always less than the maximum camera-to-subject distance for a full flash exposure.

BRIEF DESCRIPTION OF THE DRAWINGS

FIG. 1 is a block diagram of a full/fill flash control system for a camera according to a preferred embodiment of the invention;

FIGS. 2A and 2B are a microcomputer flow chart depicting the various steps of operation of the full/fill flash control system;

FIG. 3 is a schematic diagram of the contents of a non-volatile look-up table memory included in the full-/fill flash control system;

FIG. 4 is a schematic diagram depicting three flash related modes of operation, fill flash, no flash, and fill flash, of the flash control system.

DETAILED DESCRIPTION OF THE PREFERRED EMBODIMENT

Figure 2A:
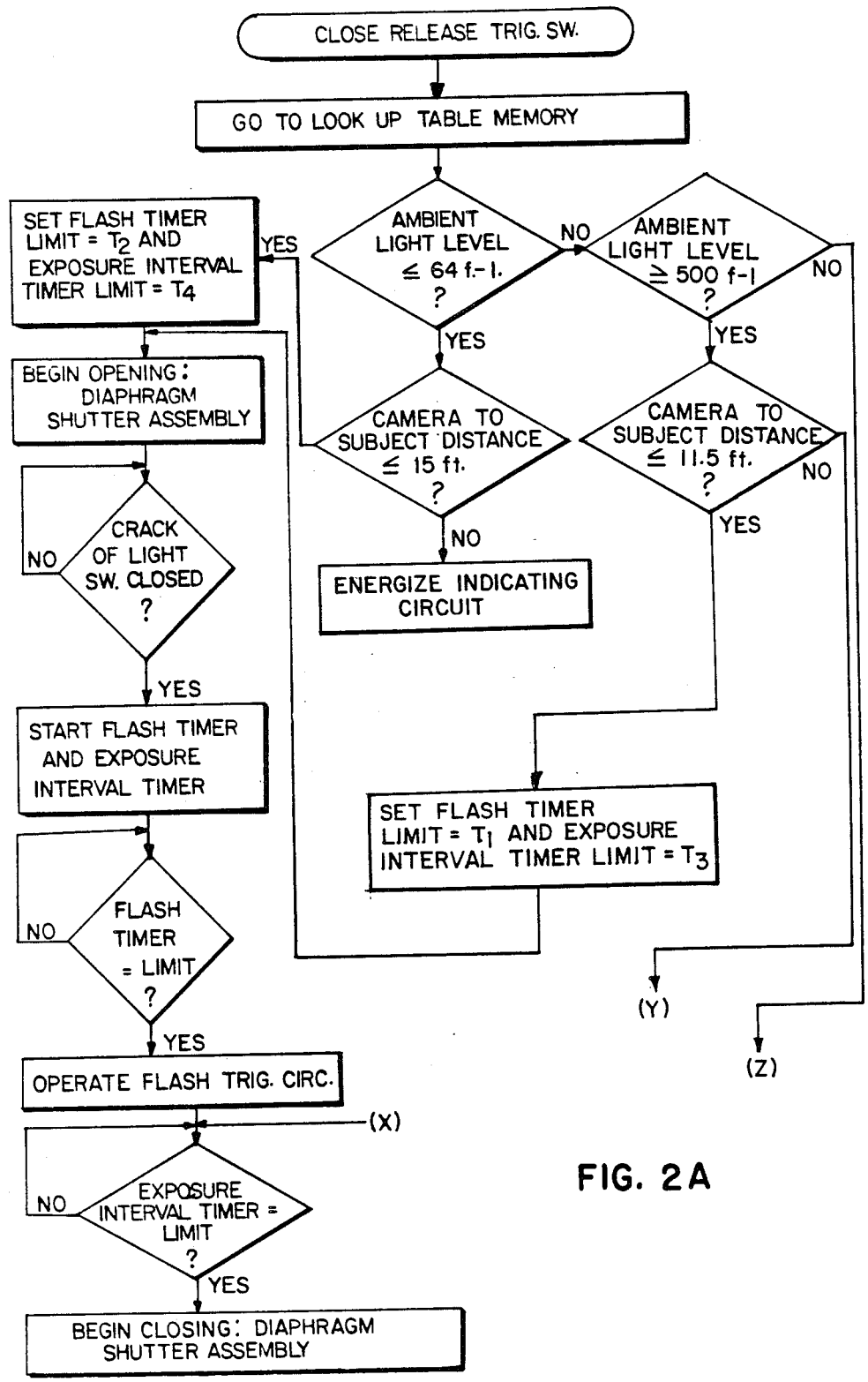

The invention is disclosed as being embodied preferably in a conventional 35 mm camera having a built-in electronic flash unit. Because such a camera is well known, this description is directed in particular to photographic elements forming part of or cooperating directly with the disclosed embodiment. It is to be understood, however, that other elements not specifically shown or described may take various forms known to persons of ordinary skill in the art.

Referring now to the drawings, FIG. 1 depicts a flash control system 1 for controlling the energization of a conventional electronic flash device 3 during a photographic exposure interval in a 35 mm camera. According to the invention, the control system 1 has three flash related modes of operation, full (or normal) flash, no flash, and fill (or fill-in) flash, one of which is automatically selected, each time the exposure interval is commenced, in accordance with a measure of the level of ambient light intensity provided by a conventional light level detecting circuit 5.

As shown in FIG. 1, the control system 1 includes, in addition to the electronic flash device 3 and the light level detecting circuit 5, a conventional microcomputer 7 having a microprocessor or central processing unit (CPU) 9, a volatile random access memory (RAM) 11, a non-volatile read-only memory (ROM) 13, a look-up table memory 15, an input/output (I/O) chip 17, a flash timer 19, and an exposure interval timer 21. Moreover, a conventional DX film speed detecting circuit 23 is shown which automatically detects the DX encoded film speed imprinted on a commercially available 35mm film cartridge. A normally open release trigger switch 25 is shown which is closed in response to manually depressing a shutter release button, not shown, on the body of the camera. A conventional, preferably automatic, camera-to-distance detecting device 27, i.e. an automatic focus device, is shown which is operated to focus an objective lens, not shown, and to provide a measure of the camera-to-subject distance. A conventional diaphragm shutter assembly 29 is shown which is opened to commence the exposure interval and closed to terminate the exposure interval in response to its receipt of respective control signals from the microcomputer 7. A normally open "crack of light" switch 31 is shown which is closed each time the diaphragm shutter assembly 29 is initially opened. A conventional flash triggering circuit 33 for energizing the electronic flash device 3 is shown which is operated by the microcomputer 7 in a full flash mode to enable a full flash exposure and is operated in a fill flash mode to enable a fill flash exposure. A conventional flash inhibit indicating circuit 35 is shown which includes a light emitting diode (LED), not shown, that is illuminated to provide a visible indication whenever the subject to be photographed is located beyond the capacity of the flash output for a full flash exposure.

When a known DX coded 35 mm film cartridge is loaded in the camera, the DX film speed detecting circuit 23 inputs the DX coded film speed imprinted on the cartridge to the microcomputer 7. Then, as schematically illustrated in FIG. 3, Table I of the look-up table memory 15 designates respective maximum camera-to-subject distances for a full flash exposure and for a fill flash exposure in accordance with the inputted film speed. For example, in the case of ISO 100 speed film, the maximum camera-to-subject distance for a full flash exposure is 15 feet and the maximum corresponding distance for a fill flash exposure is 11.5 feet. Note that in each case the maximum camera-to-subject distance for a fill flash exposure is always less than the maximum corresponding distance for a full flash exposure.

FIGS. 2A, B are a flow chart for the microcomputer 7, depicting the various steps of operation of the flash control system 1. When the release trigger switch 25 is closed in response to manual depression of the shutter release button, the microcomputer 7 interrogates its look-up table memory 15, specifically Table II, to determine whether the measure of the level of ambient light intensity provided by the light level detecting circuit 5 either is less than or equal to 64 foot-lamberts, which is too low for a proper daylight exposure, is greater than 64 foot-lamberts but less than 500 foot-lamberts, or is equal to or greater than 500 foot-lamberts, which is bright enough that shadowed areas of the subject to be photographed may result. In the case where the microcomputer 7 determines that the level of ambient light intensity is less than or equal to 64 foot-lamberts, a further interrogation of the look-up table memory 15 is made to determine whether the measure of the camera-to-subject distance provided by the camera-to-subject distance detecting device 27 is less than or equal to 15 feet or is greater than 15 feet. This distance is the maximum camera-to-subject distance for a full flash exposure using ISO 100 speed film. In the case where the microcomputer 7 determines that the level of ambient light intensity is equal to or greater than 500 foot-lamberts, another interrogation of the look-up table memory 15 is made to determine whether the measure of the camera-to-subject distance provided by the camera-to-subject distance detecting device 27 is less than or equal to 11.5 feet or is greater than 11.5 feet. This distance is the maximum camera-to-subject distance for a fill flash exposure using ISO 100 speed film. Following the appropriate determinations, one of the three flash related modes, full flash, no flash, or fill flash is automatically selected.

(A) FULL FLASH MODE STEPS

1. If, as shown in the flow chart of FIGS. 2A, B and the look-up Table II of FIG. 3, the measure of the level of ambient light intensity provided by the light level detecting circuit 5 is less than or equal to 64 foot-lamberts, and the measure of the camera-to-subject distance provided by the camera-to-subject distance detecting circuit 27 is less than or equal to 15 feet, the limit or duration of the flash timer 19 is set to $T_2$ seconds and the limit or duration of the exposure interval timer 21 is set to $T_4$ seconds. $T_4$ seconds is longer in duration than $T_2$ seconds-see FIG. 5.

Figure 5:
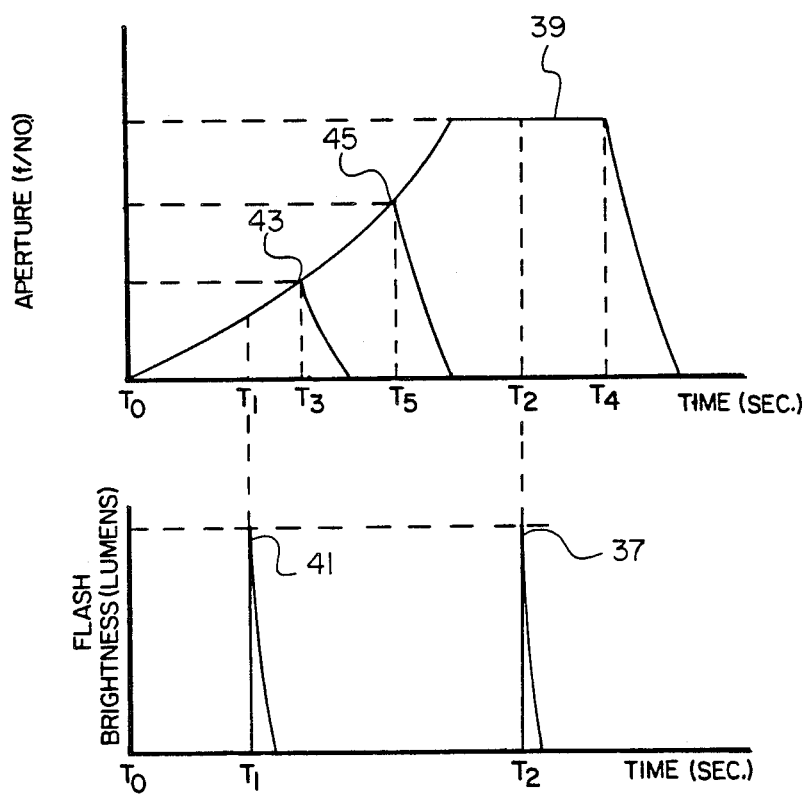
FIG. 5 is a graph-like chart comparing the exposure interval and the flash or no flash interval in each of the three modes of operation of the flash control system.

2. Then, as shown in the flow chart of FIGS. 2A, B, the microcomputer 7 issues a control signal to begin opening of the diaphragm shutter assembly 29, to commence the exposure interval. The exposure interval begins at $T_0$ seconds, as shown in FIG. 5.

3. Initial opening of the diaphragm shutter assembly 29 closes the crack of light switch 31 via a suitable known mechanism, not shown.

4. Closure of the crack of light switch 31 instructs the microcomputer 7 to simultaneously start the flash timer 19 and the exposure interval timer 21 at $T_0$ seconds.

5. When the flash timer 19 reaches the limit to which it has been set, in this instance $T_2$ seconds, the microcomputer 7 issues a control signal that operates the flash triggering circuit 33 to energize the electronic flash device 3. As shown in FIG. 5, the resulting flash discharge at $T_2$ seconds is typical. That is, it is very brief and intense, with virtually no firing delay. In FIG. 5, the area under the "spike" 37 represents the full flash output in lumen-seconds.

6. When the exposure interval timer 21 reaches the limit to which it has been set, in this instance $T_4$ seconds, the microcomputer 7 issues a control signal to begin closing of the diaphragm shutter assembly 29, to terminate the exposure interval. In FIG. 5, the area under the largest curve 39 represents the exposure interval for a full flash exposure.

Alternate 1. If, as shown in FIGS. 2A, B and FIG. 3, the measure of the level of ambient light intensity provided by the light level detecting circuit 5 is less than or equal to 64 foot-lamberts, and the measure of the camera-to-subject distance provided by the camera-to-subject distance detecting circuit 27 is greater than 15 feet, the full flash mode is inhibited or prevented. Instead, the flash inhibit indicating circuit 35 is energized to visibly indicate that the subject is located beyond the capacity of the flash output for a full flash exposure (using ISO 100 speed film).

(B) FILL FLASH MODE STEPS

1. If, as shown in FIGS. 2A, B and 3, the measure of the level of ambient light intensity provided by the light level detecting circuit 5 is equal to or greater than 500 foot-lamberts, and the measure of the camera-to-subject distance provided by the camera-to-subject distance detecting device 27 is less than or equal to 11.5 feet, the limit or duration of the flash timer 19 is set to $T_1$ seconds and the limit or duration of the exposure interval timer 21 is set to $T_3$ seconds. $T_3$ seconds is longer in duration than $T_1$ seconds (and each of these times is shorter in duration than $T_2$ seconds or $T_4$ seconds) - see FIG. 5.

2. Then, as shown in FIG. 2, the microcomputer 7 issues the control signal to begin opening of the diaphragm shutter assembly 29, to commence the exposure interval. The exposure interval begins at $T_0$ seconds, as shown in FIG. 5.

3. Initial opening of the diaphragm shutter assembly 29 closes the crack of light switch 31.

4. Closure of the crack of light switch 31 instructs the microcomputer 7 to simultaneously start the flash timer 19 and the exposure timer 21 at $T_0$ seconds.

5. When the flash timer 19 reaches the limit to which it has been set, in this instance $T_1$ seconds, the microcomputer 7 issues the control signal that operates the flash triggering circuit 33 to energize the electronic flash device 3. As shown in FIG. 5, the resulting flash discharge at $T_1$ seconds yields a fill flash output represented by the area under the spike 41. Note that the fill flash output 41 and the full flash output 37 in FIG. 5 are identical; that is, they have the same peak intensity and the same duration. The only difference between the two flash outputs is the time of introduction, $T_1$ or $T_2$.

6. When the exposure interval timer 21 reaches the limit to which it has been set, in this instance $T_3$ seconds, the microcomputer 7 issues the control signal to begin closing of the diaphragm shutter assembly 29, to terminate the exposure interval. In FIG. 5, the area under the smallest curve 43 represents the exposure interval for a fill flash exposure whenever the control system 1 is operated in the fill flash mode.

(C) NO FLASH MODE STEPS

1. If, as shown in FIGS. 2A, B and 3, the measure of the level of ambient light intensity provided by the light level detecting circuit 5 is greater than 64 foot-lamberts but less than 500 foot-lamberts, the limit or duration of the exposure interval timer 21 is set for $T_5$ seconds (no limit or duration is set for the flash timer 19). $T_5$ seconds is between $T_3$ seconds and $T_4$ seconds as to duration - see FIG. 5.

Alternate 1. If, as shown in FIGS. 2A, B and 3, the measure of the level of ambient light intensity provided by the light level detecting circuit 5 is equal to or greater than 500 foot-lamberts, and the measure of the camera-to-subject distance provided by the camera-to-subject distance detecting device 27 is greater than 11.5 feet, the limit or duration of the exposure interval timer 21 is set for $T_3$ seconds (no limit or duration is set for the flash timer 19).

2. Then, in either case, as shown in FIGS. 2A, B the microcomputer 7 issues the control signal to begin opening of the diaphragm shutter assembly 29, to commence the exposure interval. The exposure interval begins at $T_0$ seconds, as shown in FIG. 5.

3. Initial opening of the diaphragm shutter assembly 29 closes the crack of light switch 31.

4. Closure of the crack of light switch 31 instructs the microcomputer to start the exposure interval timer 21 (but not the flash timer 19) at $T_0$ seconds.

5. When the exposure interval timer 21 reaches the limit to which it has been set, in this instance either $T_3$ or $T_5$ seconds, the microcomputer 7 issues the control signal to begin closing of the diaphragm shutter assembly 29, to terminate the exposure interval. In FIG. 5, the area under the midsize curve 45 represents the exposure interval for an ambient light (no flash) exposure whenever the level of ambient light intensity is greater than 64 foot-lamberts and less than 500 foot-lamberts. Moreover, the area under the smallest curve 43 represents the exposure interval for an ambient light exposure whenever the level of ambient light intensity is equal to or greater than 500 foot-lamberts and the camera-to-subject distance is greater than 11.5 feet.

Accordingly, with the control system 1, a full flash exposure will automatically be selected in accordance with both the level of ambient light intensity and the camera-to-subject distance, a no flash exposure will automatically be selected in accordance with only the level of ambient light intensity, and either a fill flash exposure or a no flash exposure will automatically be selected in accordance with both the level of ambient light intensity and the camera-to-subject distance. Moreover, the maximum camera-to-subject distance suitable for a fill flash exposure is always less than the maximum camera-to-subject distance suitable for a full flash exposure. This is illustrated in schematic fashion in FIG. 4.

OPERATION

The control system 1 automatically operates in a full flash mode whenever the ambient light level is too low for a proper daylight exposure and the camera-to-subject distance does not exceed a maximum distance suitable for a full flash exposure. Conversely, when the camera-to-subject distance exceeds the maximum distance sutable for a full flash exposure, the full flash mode is inhibited and a visible warning is provided.

The control system 1 automatically operates in a fill flash mode whenever the ambient light level is bright enough that areas of the subject may be substantially shadowed and the camera-to-subject distance does not exceed a maximum distance small enough to ensure that the fill flash output will lighten the shadowed areas. The maximum distance suitable for a fill flash exposure is always less than the maximum distance suitable for a full flash exposure.

When the camera-to-subject distance exceeds the maximum distance suitable for a fill flash exposure, the control system 1 can revert from the fill flash mode to a no flash mode. In the no flash mode, a daylight exposure is taken.

When the ambient light level is between the low and high light levels corresponding to the full flash and fill flash modes, the control system automatically operates in the no flash mode. This is done regardless of the camera-to-subject distance.

The invention has been described with reference to a preferred embodiment. However, it will be appreciated that variations and modifications can be effected within the ordinary skill in the art without departing from the scope of the invention. For example in the preferred embodiment, the three exposure interval curves 39, 43, and 45 assume a film speed of ASA 100. With other film speeds, the curves of course would be somewhat different as to aperture and/or as to the closing times $T_4$, $T_3$, and $T_5$. Also, the flash output spikes 37 and 41 for full flash and fill flash might be somewhat different as to the times $T_2$ and $T_1$.

In the preferred embodiment, the exposure interval curves 39, 41, and 45 are limited to three in number. However, it will be appreciated that this number can be increased. Also, the control system can be made more sophisticated simply by increasing the number of light level zones in the look-up table memory 15.

In the preferred embodiment, there is employed a camera-to-subject distance detecting 27. However, it will be appreciated that in place of the device 27 a known flash-to-subject distance detecting device may be used.

In the preferred embodiment, the maximum camera-to-subject distance suitable for a full flash exposure is varied in accordance with the film speed, and the maximum corresponding distance suitable for a fill flash exposure remains the same regardless of the film speed. However, it will be appreciated that the maximum camera-to-subject distance for a fill flash exposure can similarly be varied.

I claim:

1. An improved artificial illumination control system for controlling the energization of an electronic flash device during a photographic exposure interval in a camera, wherein (a) said electronic flash device is operated selectively to effect a full flash exposure or a fill flash exposure and (b) camera-to-subject distance detecting means provides a measure of the camera-to-subject distance, and wherein the improvement comprises:

means for defining a maximum camera-to-subject distance suitable for a full flash exposure and a maximum camera-to-subject distance suitable for a fill flash exposure, the maximum distance for a fill flash exposure always being less than the maximum distance for a full flash exposure.

2. The improvement as recited in claim 1, wherein said camera includes a film speed detecting circuit and said defining means varies said maximum camera-to-subject distance for a full flash exposure in accordance with the detected film speed, but does not vary said maximum camera-to-subject distance for a fill flash exposure regardless of the detected film speed.

3. An improved artificial illumination control system for controlling the energization of an electronic flash device during a photographic exposure interval in a camera, wherein (a) flash triggering means for energizing said electronic flash device is operated in a full flash mode to effect a full flash exposure and is operated in a fill flash mode to effect a full flash exposure and (b) camera-to-subject distance detecting means provides a measure of the camera-to-subject distance, and wherein the improvement comprises:

comparator means for determining that the measure of the camera-to-subject distance provided by said camera-to-subject distance detecting means does not exceed a maximum distance, which is the maximum camera-to-subject distance suitable for a full flash exposure, or does not exceed a lesser distance, which is a predetermined camera-to-subject distance small enough to ensure that the fill flash output will lighten shadowed areas of the subject during a fill flash exposure; and control means, acting subsequent to said comparator means determining that said measure of the camera-to-subject distance does not exceed said maximum distance, for operating said flash triggering means in its full flash mode, and acting subsequent to said comparator means determining that said measure of the camera-to-subject distance does not exceed said lesser distance, for operating said flash triggering means in its fill flash mode, whereby the maximum camera-to-subject distance for a fill flash exposure is always less than the maximum camera-to-subject distance for a full flash exposure.

4. The improvement as recited in claim 3, wherein said electronic flash device provides the same flash output in lumen-seconds whether said flash triggering means is operated in its full flash mode or its fill flash mode.

5. An improved artificial illumination control system for controlling the energization of an electronic flash device during a photographic exposure interval in a camera, wherein (a) light level detecting means provides a measure of the level of ambient light intensity, (b) flash triggering means for energizing said electronic flash device is operated in a full flash mode to effect a full flash exposure and is operated in a fill flash mode to effect a fill flash exposure, and (c) camera-to-subject distance detecting means provides a measure of the camera-to-subject distance, and wherein the improvement comprises:

comparator means for determining that the measure of the level of ambient light intensity provided by said light level detecting means is less than or equal to a relatively low light level, which is too low for a proper daylight exposure, or is equal to greater than a substantially bright light level, which is high enough that shadowed areas of the subject to be photographed may result, and for determining that the measure of the camera-to-subject distance provided by said camera-to-subject distance detecting means does not exceed a maximum distance, which is the maximum camera-to-subject distance suitable for a full flash exposure, or does not exceed a lesser distance, which is a predetermined camera-to-subject distance small enough to ensure that the fill flash output will lighten shadowed areas of the subject during a fill flash exposure; and control means, acting subsequent to said comparator means determining that said measure of the level of ambient light intensity is less than or equal to said low light level and said measure of the camera-to-subject distance does not exceed said maximum distance, for operating said flash triggering means in its full flash mode, and acting subsequent to said comparator means determining that said measure of the level of ambient light intensity is equal to or greater than said bright light level and said measure of the camera-to-subject distance does not exceed said lesser distance, for operating said flash triggering means in its fill flash mode, whereby the maximum camera-to-subject distance for a fill flash exposure is always less than the maximum camera-to-subject distance for a full flash exposure.

* * * * *